United States Patent
Phillips et al.

(10) Patent No.: US 9,574,689 B2
(45) Date of Patent: Feb. 21, 2017

(54) COMPOSITE ROTARY UNION FOR HOSE REEL

(71) Applicant: Suncast Technologies, LLC, Palm Beach Gardens, FL (US)

(72) Inventors: William J. Phillips, Batavia, IL (US); Michael R. Vogler, Oswego, IL (US)

(73) Assignee: Suncast Technologies, LLC, Palm Beach Gardens, FL (US)

(*) Notice: Subject to any disclaimer, the term of this patent is extended or adjusted under 35 U.S.C. 154(b) by 211 days.

(21) Appl. No.: 14/194,446

(22) Filed: Feb. 28, 2014

(65) Prior Publication Data

US 2015/0247600 A1    Sep. 3, 2015

(51) Int. Cl.
| F16L 27/00 | (2006.01) |
| F16L 27/08 | (2006.01) |
| F16L 33/00 | (2006.01) |
| F16L 37/53 | (2006.01) |

(52) U.S. Cl.
CPC ............ *F16L 27/0816* (2013.01); *F16L 33/00* (2013.01); *F16L 37/53* (2013.01)

(58) Field of Classification Search
CPC ..... F16L 27/08; F16L 27/0804; F16L 27/0808
USPC .............................. 285/277, 392, 391, 36, 40
See application file for complete search history.

(56) References Cited

U.S. PATENT DOCUMENTS

| 4,512,361 | A | 4/1985 | Tisbo et al. |
| 5,046,520 | A | 9/1991 | Sanchez, Jr. et al. |
| 5,676,402 | A | 10/1997 | Eley et al. |
| 5,797,424 | A | 8/1998 | Tisbo et al. |
| 6,637,454 | B1 | 10/2003 | Eley |
| 7,377,289 | B1 | 5/2008 | English et al. |
| 7,389,790 | B1 | 6/2008 | Eley et al. |
| 7,568,737 | B2 * | 8/2009 | Wells ............... F16L 15/008 285/34 |
| 2009/0121067 | A1 | 5/2009 | Arcati et al. |

* cited by examiner

*Primary Examiner* — Aaron Dunwoody
(74) *Attorney, Agent, or Firm* — McHale & Slavin, P.A.

(57) ABSTRACT

The present device provides a composite rotary union assembly which overcomes the disadvantages of prior art rotary union assemblies. The composite rotary union assembly of the present invention provides for supplying water or gas to a rotatable reel assembly, it also provides metal inserts for high wear areas of the rotary union assembly, including the threads, for longer useful life of the assembly while providing a resin structure for supporting and placing the metal portions.

22 Claims, 8 Drawing Sheets

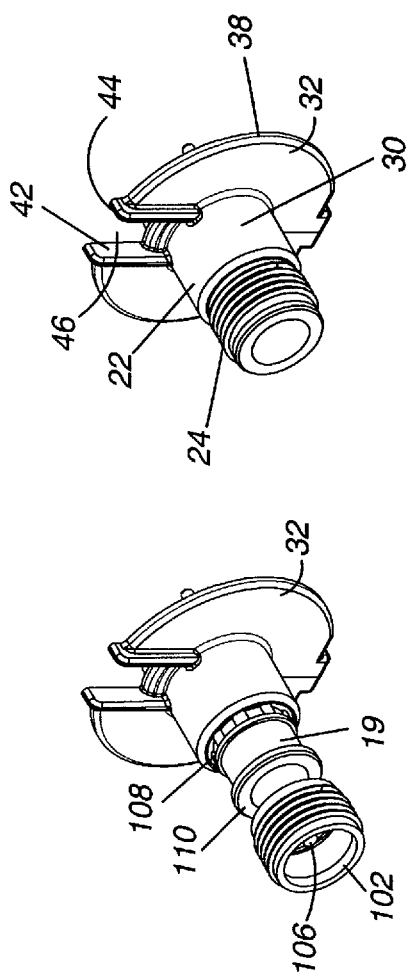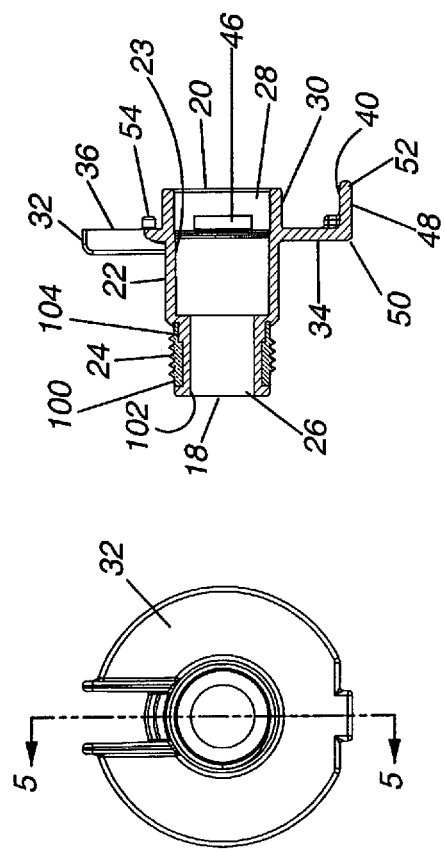

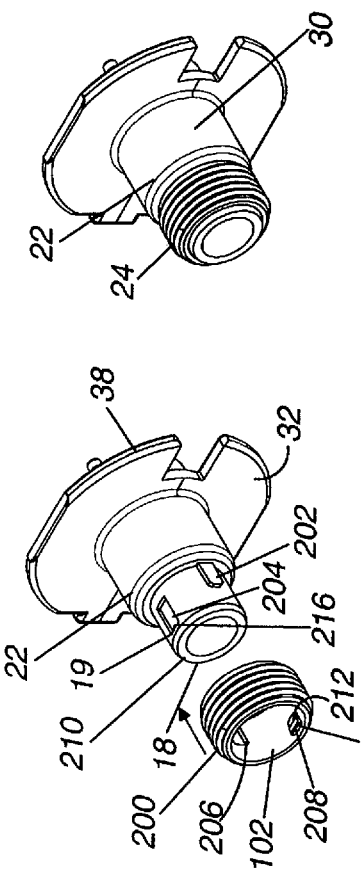
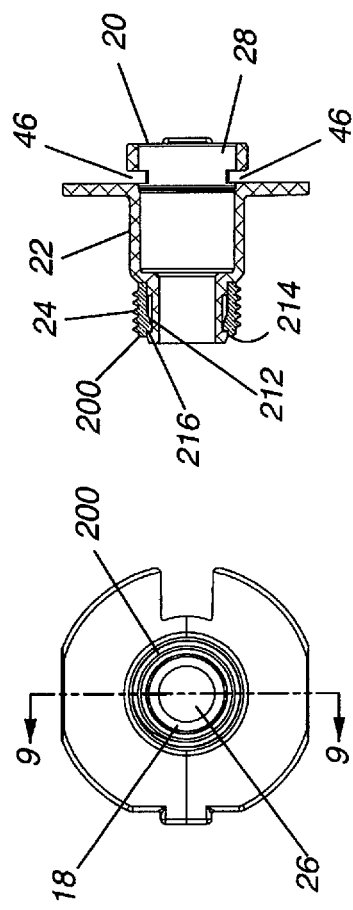

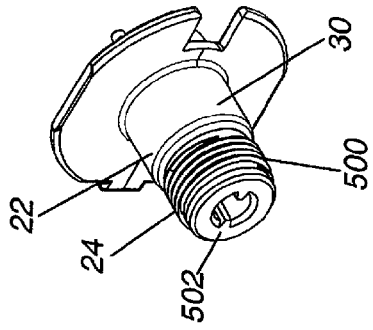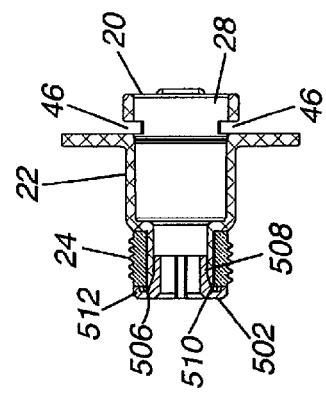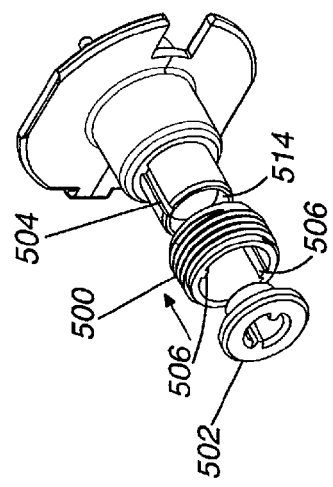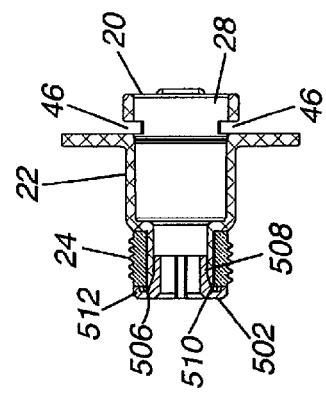
FIG. 18
FIG. 21
FIG. 19
FIG. 20

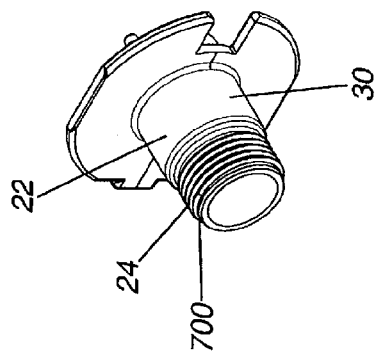
FIG. 25
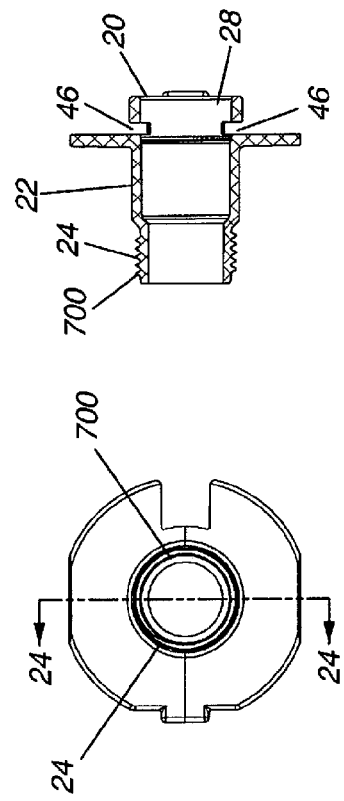
FIG. 27
FIG. 26

COMPOSITE ROTARY UNION FOR HOSE REEL

RELATED APPLICATIONS

This application is related to U.S. patent application Ser. No. 13/024,956, entitled Strengthened Inlet/Outlet Swivel Union Fluid Conduit For a Hose Reel, filed Feb. 10, 2011, the contents of which are incorporated herein by reference.

FIELD OF INVENTION

The present invention relates to hose reels, and more particularly to a rotary union assembly for transferring fluids from a pressurized fluid source to a hose reel storage device.

BACKGROUND INFORMATION

Garden hoses are a necessity for homeowners and business owners for lawn and garden care, as well as general all-around home care. Typically, hoses are found either wound and left on the ground near a water spigot, or wound on one of many known hose reel-type storage devices. These devices include stationary frames, stationary hose reel hangers that can be mounted to a surface of a building such as an outer wall of a house, and hose reel carts that include wheels for portability. A typical hose reel cart includes a rotatable reel or spool which includes a crank handle extending through the frame such that the spool can be rotated by hand and the hose can be wound or unwound about the spool for storage or use. To provide for flow of water from a water source to the hose, hose reel structures further contain rotary unions. Typical rotary unions have a stationary inlet tube and a movable outlet tube. The stationary inlet tube of the rotary union extends away from the reel and is structured to be coupled to a supply hose, which is further coupled to a water supply. The movable outlet tube cooperates with the inlet tube on one end so that it is rotatable with the spool and includes a second end that is disposed on the circumference of the reel. A hose is coupled to the second end of the movable outlet and is used to deliver water to the end use. The hose is merely wound upon the reel for storage, and pulled or dispensed from the reel for use. Often, these hose reel carts include wheels to permit ready transport of the hose from one location to another.

Hose carts are commonly purchased by the general consumer, wherein it is desirable that the hose cart can be easily assembled with minimal use of hand tools. In an effort to provide easy-to-assemble hose reel assemblies, they are typically made of plastic and sold with as many preassembled parts as possible. Many hose reels are currently sold in a ready to use condition, whereby the user merely needs to hook the device to a supply of water or air to use the device.

While such efforts have provided the general consumer with a product that is ready to use out of the box, disassembly for maintenance or repair can be difficult. The components are typically formed from resin, e.g. plastic, thereby including plastic threads for cooperation with the hoses that connect to the water or air supply and to the distribution hose. Plastic threads wear quickly and are easily cross-threaded during assembly of the hoses, resulting in leaks that can only be cured with component replacement. In addition, plastic degrades quickly in many environments causing the plastic to become brittle, whereby threads are easily broken. Metal rotary union assemblies have been suggested, however, the complexity of the parts requires expensive tooling. In addition, machining operations are typically required to provide the finishes necessary for proper operation. The nature of molding hot metal necessarily requires extensive maintenance to keep the tooling in operation, increasing the cost of metal rotary union assemblies.

Therefore, what is needed in the art is a rotary union assembly for a hose reel that is formed predominantly from resin materials while including metal inserts in high wear and typical fail points of rotary union assemblies.

Thus, the present invention provides a rotary union assembly which overcomes the disadvantages of prior art rotary union assemblies. The rotary union assembly of the present invention not only provides for supplying water or gas to a rotatable reel assembly, it also provides metal inserts for threads and high wear areas for longer useful life of the components.

SUMMARY OF THE INVENTION

Briefly, the present invention provides a composite rotary union assembly which overcomes the disadvantages of prior art rotary union assemblies. The composite rotary union assembly of the present invention provides for supplying water or gas to a rotatable reel assembly; it also provides metal inserts for high wear areas of the rotary union assembly including the threads for longer useful life of the assembly while providing a resin structure for supporting and placing the metal portions.

Accordingly, it is an objective of the present invention to provide a composite rotary union assembly for rotatable hose reels whereby the rotary union assembly is formed as a composite of metal and resin.

It is a further objective of the present invention to provide a composite rotary union assembly wherein the metal portions are molded into place within the resin material.

It is yet a further objective of the present invention to provide a composite rotary union assembly wherein the metal portions are pressed onto the resin and retained with snap-locks.

It is another objective of the instant invention to provide a composite rotary union assembly wherein the metal portions are pressed or slipped onto the resin components and a portion of the resin is heat formed to retain the metal in position.

It is still another objective of the present invention to provide a composite rotary union assembly wherein the metal portions are slipped onto the resin components and a portion of the metal is roll formed or stamped to retain the metal in position.

It is still yet another objective of the present invention to provide a composite rotary union assembly wherein the metal portions are slipped onto the resin components and a fastener member is adhered to the resin to retain the metal in position.

Still yet another objective of the present invention is to provide a composite rotary union assembly wherein the in-tube is formed from a metal while the out-tube is formed from a resin material.

Yet another objective of the present invention is to provide a composite rotary union assembly wherein the portions of the rotary union assembly are metal plated resin.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE FIGURES

FIG. 2 is a partial top perspective view of the in-tube shown in FIG. 1 illustrating a formed in place construction for the composite in-tube;

FIG. 3 is an exploded view of the embodiment shown in FIG. 2;

FIG. 4 is a front view of the in-tube shown in FIG. 2;

FIG. 5 is a section view taken along lines 5-5 of FIG. 4 illustrating the metal and resin portions of the composite in-tube;

FIG. 6 is a partial top perspective view of one embodiment of the in-tube shown in FIG. 1 illustrating a push on type of construction for the composite in-tube;

FIG. 7 is an exploded view of the embodiment shown in FIG. 6;

FIG. 8 is a front view of the in-tube shown in FIG. 6;

FIG. 9 is a section view taken along lines 9-9 of FIG. 6 illustrating the metal and resin portions of the composite in-tube;

FIG. 18 is a partial top perspective view of one embodiment of the in-tube shown in FIG. 1 illustrating a glue-on type of construction for the composite in-tube;

FIG. 19 is an exploded view of the embodiment shown in FIG. 18;

FIG. 20 is a front view of the in-tube shown in FIG. 18;

FIG. 21 is a section view taken along lines 21-21 of FIG. 20 illustrating the metal and resin portions of the composite in-tube;

FIG. 25 is a partial top perspective view of one embodiment of the in-tube shown in FIG. 1 illustrating a metal plated resin type of construction for the composite in-tube;

FIG. 26 is a front view of the in-tube shown in FIG. 25; and

FIG. 27 is a section view taken along lines 27-27 of FIG. 26 illustrating the metal and resin portions of the composite in-tube.

DETAILED DESCRIPTION OF THE PREFERRED EMBODIMENTS

Figure 1:
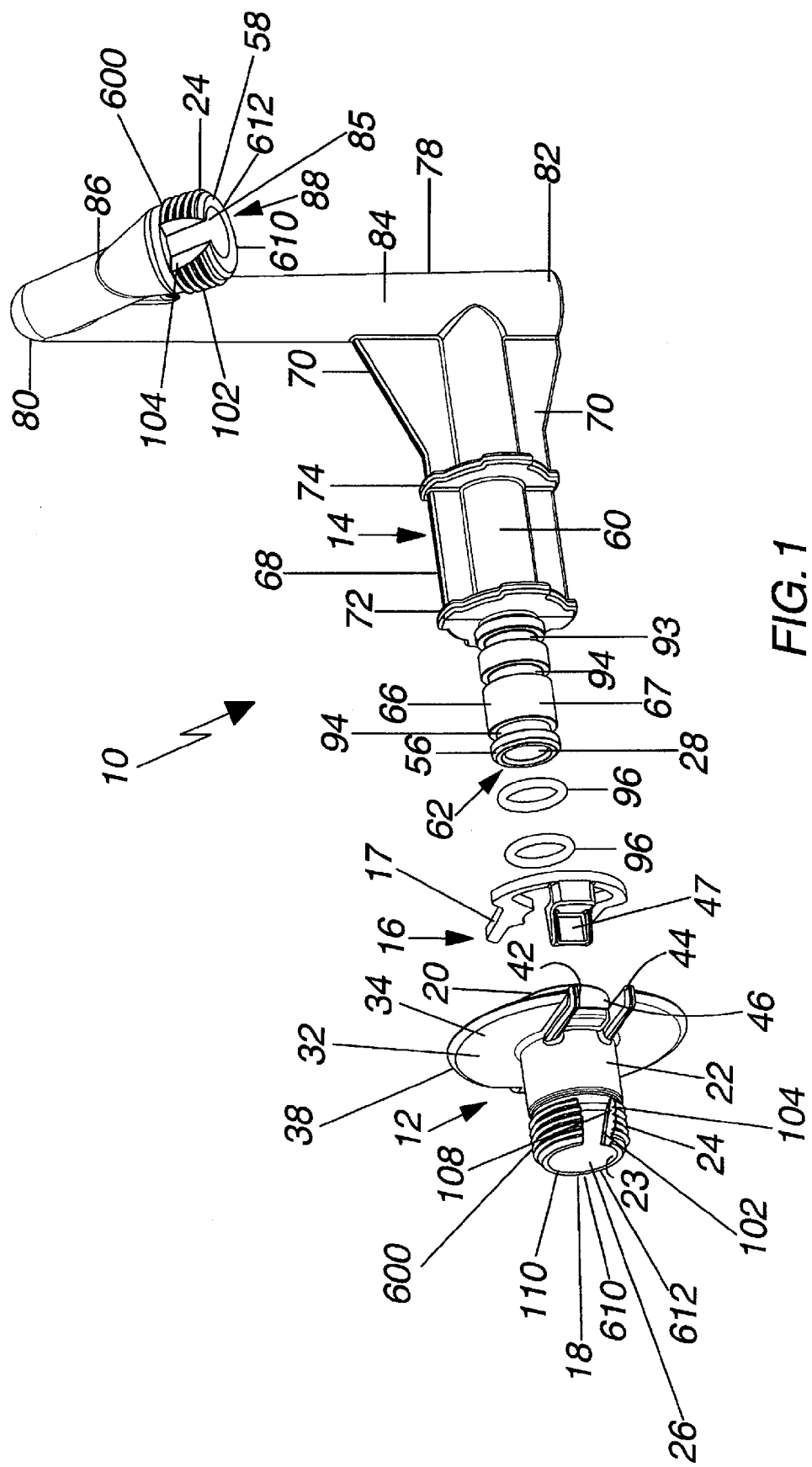
FIG. 1 is an exploded view of one embodiment of a composite rotary union of the present invention.
Figure 10:
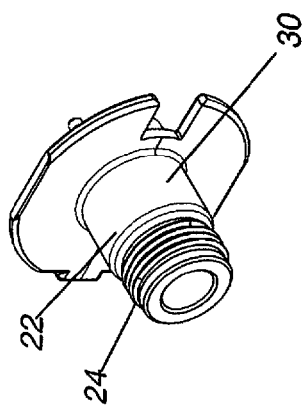
FIG. 10 is a partial top perspective view of one embodiment of the in-tube shown in FIG. 1 illustrating a hot form type of construction for the composite in-tube.
Figure 11:
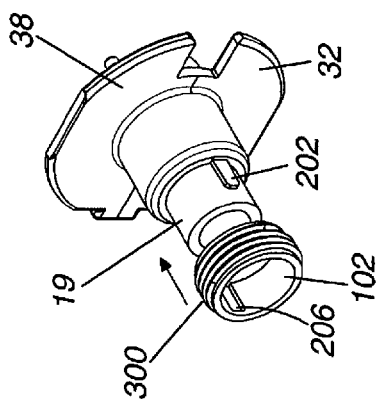
FIG. 11 is an exploded view of the embodiment shown in FIG. 10.
Figure 13:
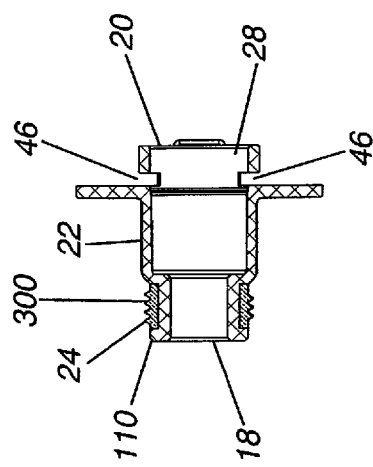
FIG. 13 is a section view taken along lines 13-13 of FIG. 12 illustrating the metal and resin portions of the composite in-tube.
Figure 12:
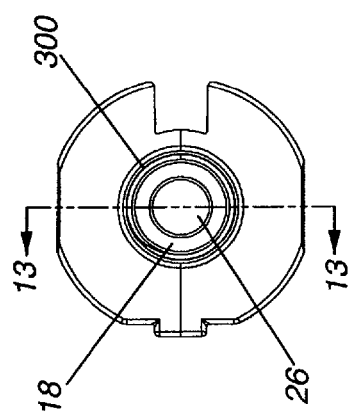
FIG. 12 is a front view of the in-tube shown in FIG. 10.
Figure 14:
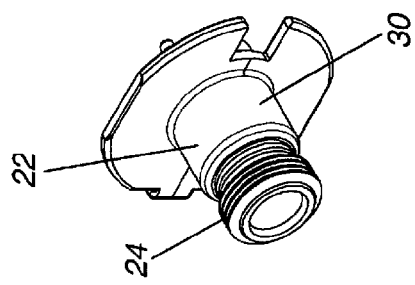
FIG. 14 is a partial top perspective view of one embodiment of the in-tube shown in FIG. 1 illustrating a crimp-on type of construction for the composite in-tube.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Referring generally to the figures, a composite rotary union, generally referred to as 10, is illustrated. While the composite rotary union assembly can be made of any material, it is preferably made of a combination of resin, e.g. plastic with metal inserts 100, 200, 300, 400, 500, 600, and 700 positioned in high wear or high stress areas, which provides the necessary strength, durability, and precision needed to perform its required functions. The metal inserts 100, 200, 300, 400, 500, 600, and 700 further provide stronger engagement with mating hose couplings and reduce the possibility of cross threading when attaching the inlet tube 12 or outlet conduit 14 to an elongated hose member. The composite rotary union assembly 10 may be used for various applications that require transfer of fluids from one place to another when one assembly needs to rotate while the other remains fixed. A common application of the composite rotary union assembly 10 includes being part of a hose reel assembly. Accordingly, the instant invention will be described using such an application. However, placement or use in hose reel assemblies is not a limiting application as the composite rotary union assembly 10 can be placed in other devices as well. In should be noted that while the primary embodiments are illustrated in the form of the inlet tube, all the embodiments may be applied to the outlet conduit without departing from the scope of the present disclosure. It should also be appreciated that while the metal inserts 100, 200, 300, 400, 500, 600, and 700 are illustrated as solid metal, resins coated or plated with metal may be utilized without departing from the scope of the invention.

Referring to the Figures, the composite rotary union assembly 10 includes an inlet tube 12, an outlet conduit 14, and a securing member 16. The inlet tube 12 includes a first end 18 and a second end 20. The distance between the first end 18 and the second end 20 defines the inlet tube main body 22. In the preferred embodiment, the inlet tube main body 22 is generally cylindrical in shape and tubular in construction. The inlet tube main body 22 has an inner diameter 23, which is larger than the outer diameter 66 of a first end 56 of the outlet conduit 14. The first end 18 of the inlet tube is designed to be coupled or attached to an external fluid supply, such as a hose connected to water supply line (not illustrated). For connection to the hose, the inlet tube 12 includes a metal insert 100, 200, 300, 400, 500, 600, and 700 secured or otherwise formed to a polymeric resin, e.g. plastic, which forms the remainder of the inlet tube 12. As such, the metal insert 100 contains helical threads 24 or other hose connectors for attachment to a hose member; such connections may include bayonet mount, quick connector, barbed connections and the like. The first end 18 further includes an opening 26 for transfer of fluids through the inlet tube. The second end 20 is constructed and arranged to couple or engage with a first end of the outlet conduit 14 and contains an opening 28. The inner diameter 23 is a generally smooth bore extending from the second end 20 sufficiently toward the first end 18 to cooperate with seals or O-rings 96 positioned along the outer diameter 66 of the outlet conduit 14. A keying window 46 (FIG. 5) is provided along the second end 20 which cooperates with the securing member 16 and the snap ring groove 93 for securing the inlet tube to the outlet conduit so that one may rotate with respect to the other while maintaining a fluid tight seal therebetween. Arranged circumferentially around the outer surface 30 of the inlet tube main body 22 is a flange 32. The flange 32 is illustrated as having a generally circular shape. However, such shape is illustrative of a particular embodiment and such shape is not limiting. The flange 32 contains a front surface 34, a back surface 36, an outer edge 38 and an inner edge 40 (FIG. 5). Positioned along the circumference of the flange 32 and extending inwardly toward the center are horizontal edges 42 and 44. Between horizontal edges 42 and 44 is an open space or keying window 46. The window 46 is sized and shaped to receive a lever portion 47 of the securing member 16. In this manner, the securing member 16 is forced to rotate or remain stationary with the inlet tube 12. Groove 93 provides a track for the distal ends 17 of the securing member during rotation. In a preferred embodiment, opposing the horizontal edges 42 and 44 is tab 48 (FIG. 5), which secures to or engages the wall or frame of a hose reel assembly to prevent the flange and/or the inlet tube 12 from rotating during use. The tab 48 contains a rounded front portion 52, and a second generally rectangular member 54 which extends in an outward direction from the back surface 36. The metal insert 100, 200, 300, 400, 500, 600, and 700 may be made by any number of processes for manufacturing metal including, but not limited to, machining, casting, forging, 3D printing, roll forming, plating and the like.

Referring to FIG. 1, in this embodiment, the metal insert portion 600 is molded in place during the molding process of the in-tube. The metal insert 600 includes a first bore 102 that is generally smooth and cylindrical in shape. A second bore 104 includes undulations or contours 106 which engage mirrored contours 108 on the core 19 to prevent rotation of the metal insert with respect to the inlet tube 12 (FIGS. 2-5). In a preferred embodiment, the metal insert 600 is placed into the plastic mold (not shown) and the plastic is injected under pressure to fill in the remainder of the mold cavity forming the core 19 at the first end 18 of the main body 22 within the metal insert 600. Whereby the mirrored contours 108 are formed in place. The end flange 610 is formed as a portion of the metal insert 600 to create a sealing surface 612 for the hose member.

Still referring to FIG. 1, the outlet conduit 14 includes a first end 56 and a second end 58. The distance between the first end and the second end defines a generally cylindrically shaped outlet conduit body 60. The first end 56 is sized and shaped to couple or engage the inlet tube 12 through insertion within the second end 20 of the inlet tube 12. The connector portion 67 includes O-ring or seal grooves 94 and snap ring grooves 93, which cooperates with the securing member 16 to maintain watertight engagement between the inlet tube 12 and the outlet conduit 14. Positioned along the outer surface 66 of the horizontal outlet conduit body 60 are gussets 68 and 70. A plurality of outwardly extending keyed flanges 72 and 74 are sized and shaped to provide support for, coupling to and/or engaging with the hose reel spool or the wall or frame of the hose reel assembly. The keyed flanges 72 and 74 prevent the hose reel spool from rotating separately from the outlet conduit 14. The horizontal portion of the outlet conduit body 60 is shaped to extend through the central portion of a hose spool. Accordingly, the length can be varied depending on the length and diameter of the hose spool, while the vertical outlet conduit body 78 includes a length to reach the outer diameter of the hose spool. The vertical outlet conduit body 78 includes a top end 80, a bottom end 82, and a vertical outlet conduit main body 84. The interior of the vertical outlet conduit main body contains a bore 85, which is sized and shaped to flow a suitable volume of fluid for a garden hose. The top portion 80 contains a transverse positioned L-shaped portion 86 terminating in opening 88. The opening 88 may define the second end of the outlet conduit 14. The L-shaped portion 86 is designed to be coupled or attached to a fluid dispensing device, such as an elongated hose member (not illustrated). As such, the metal insert 600 on the L-shaped portion 86 contains threading 24 or other hose connectors, which may employ the teachings of the present invention. It should be noted that while the outlet conduit is illustrated as being inserted into the inlet tube, this arrangement may be reversed without departing from the scope of the invention.

Referring to FIGS. 2-5, one embodiment of the composite in-tube is illustrated. In this embodiment, the metal insert portion 100 is molded in place during the molding process of the in-tube. The metal insert 100 includes a first bore 102 that is generally smooth and cylindrical in shape. A second bore 104 includes undulations or contours 106 which engage mirrored contours 108 on the core 19 to prevent rotation of the metal insert with respect to the inlet tube 12. In a preferred embodiment, the metal insert 100 is placed into the plastic mold (not shown) and the plastic is injected under pressure to fill in the remainder of the mold cavity forming the core 19 at the first end 18 of the main body 22 within the metal insert 100. Whereby the mirrored contours 108 and the end flange 110 are formed in place. The end flange 110 prevents the metal insert from being pulled off of the first end of the main body under pressure or when the hose member is connected to the inlet tube 12.

Referring to FIGS. 6-9, an alternative embodiment of the inlet tube 12 is illustrated. In this embodiment, the metal insert 200 is pressed onto the first end 18 of the inlet tube 12 after injection molding of the inlet tube 12 is completed. In order to prevent rotation of the metal insert 200, the first end 18 of the inlet tube 12 is provided with at least one, and more preferably two key members 202 which are preferably molded in place on opposite sides of the first end 18 core 19 of the inlet tube. However, it should be noted, the key member may be glued, fused, placed in a keyway, or otherwise suitably secured to the inlet tube to prevent rotation of the metal insert 200 without departing from the scope of the invention. The key members 202 are positioned and sized to cooperate with keyways 206 integrally formed into the first bore 102 of the metal insert 200. The core 19 of the first end 18 of the inlet tube 12 also includes at least one, and more preferably two-ramp lock catches 204 positioned to cooperate with ramp locks 208. In operation, the metal insert 200 is aligned with the core 19 on the first end 18 of the inlet tube 12, whereby the first bore 102 is sized for a slip or slight interference fit with the core. As the metal insert is slid toward the main body 22, the keys 202 are aligned with the key members 206. Thereafter, the sloped portion 212 of the ramp locks 208 engage the chamfer 210 causing the plastic to deform enough to allow the ramp locks 208 to pass over the core 19 until it enters the ramp lock catches 204 allowing the vertical face 214 of the ramp lock to engage the front face 216 of the ramp catches 204 securing the metal insert in position.

Referring to FIGS. 10-13, an alternative embodiment of the inlet tube 12 is illustrated. In this embodiment, the metal insert 300 is slipped onto the first end 18 of the inlet tube 12 after injection molding of the inlet tube 12 is completed. Hot forming is then utilized to form the end flange 110. The end flange 110 prevents the metal insert from being pulled off of the first end of the main body under pressure or when the hose member is connected to the inlet tube 12. In order to prevent rotation of the metal insert 300, the first end 18 of the inlet tube 12 is provided with at least one, and more preferably two key members 202 which are preferably molded in place on opposite sides of the core 19 on the first end 18 of the inlet tube 12. However, it should be noted, the key members 202 may be glued, fused, placed in a keyway, or otherwise suitably secured to the inlet tube core 19 to prevent rotation of the metal insert 300 without departing from the scope of the invention. The key members 202 are positioned and sized to cooperate with keyways 206 integrally formed into the first bore 102 of the metal insert 300. In operation, the metal insert 300 is aligned with the core 19 on the first end 18 of the inlet tube 12 whereby the first bore 102 is sized for a slip or slight interference fit with the core. As the metal insert is slid toward the main body 22, the keys 202 are aligned with the key members 206. Thereafter, a hot or ultrasonic tool (not shown) is used to form end flange 110 securing the metal insert in position.

Figure 15:
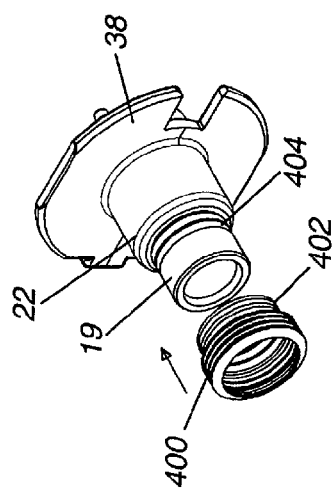
FIG. 15 is an exploded view of the embodiment shown in FIG. 14.
Figure 17:
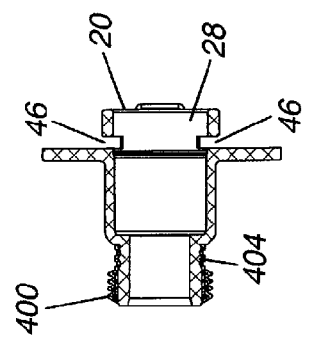
FIG. 17 is a section view taken along lines 17-17 of FIG. 16 illustrating the metal and resin portions of the composite in-tube.
Figure 16:
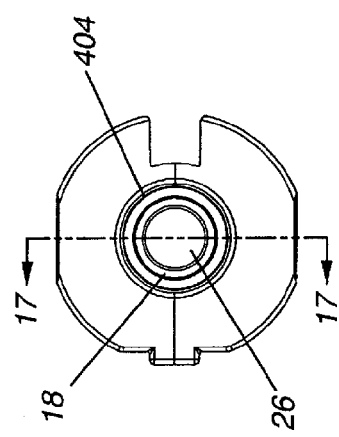
FIG. 16 is a front view of the in-tube shown in FIG. 14.

Referring to FIGS. 14-17, an alternative embodiment of the inlet tube 12 is illustrated. In this embodiment, the metal insert 400 is slipped onto the core 19 of the first end 18 of the inlet tube 12 as illustrated in FIG. 15. Roll forming is then utilized to form the second end 402 of the metal insert. In order to prevent rotation of the metal insert 400, the core 19 of the inlet tube 12 is provided with at least one, and more preferably two roll beads 404 which are preferably molded in place on the core 19 positioned on the first end 18 of the inlet tube 12. The roll forming of the metal insert 400 pushes a portion of the insert into the roll beads, also preventing the metal insert from being pulled off of the first end of the main body under pressure or when the hose member is connected to the inlet tube 12. In operation, the metal insert 400 is aligned with the core 19 on the first end 18 of the inlet tube 12 whereby the first bore 102 is sized for a slip or slight interference fit with the core. Once the metal insert has been seated in place, a roll form machine is used to force portions of the metal insert into the roll beads 404 securing the metal insert in position.

Referring to FIGS. 18-21, an alternative embodiment of the inlet tube 12 is illustrated. In this embodiment, the metal insert 500 is slipped onto the first end 18 of the inlet tube 12 after injection molding of the inlet tube 12 is completed. The end flange 502 is thereafter pressed or adhered into place. The end cap 502 prevents the metal insert 500 from being pulled off of the first end of the main body under pressure or when the hose member is connected to the inlet tube 12. In order to prevent rotation of the metal insert 500, the first end 18 of the inlet tube 12 is provided with at least one, and more preferably two key slots 504 which are preferably molded in place on opposite sides of the core 19 on the first end 18 of the inlet tube 12. However, it should be noted, the key slots 504 may be machined or otherwise suitably formed into the inlet tube core 19 to prevent rotation of the metal insert 500 without departing from the scope of the invention. The key slots 504 are positioned and sized to cooperate with keys 506 integrally formed into the first bore 102 of the metal insert 500. In operation, the metal insert 500 is aligned with the core 19 on the first end 18 of the inlet tube 12 whereby the first bore 102 is sized for a slip or slight interference fit with the core. As the metal insert is slid toward the main body 22, the keys 506 are aligned with the key slots 504. Thereafter, the end cap 502 is glued, pressed or welded into the bore of the inlet tube to secure the metal insert in position. The end cap 502 preferably includes a stem portion 508, a cone portion 510 and a flange portion 512. The stem portion is preferably round and tubular in shape to fit within the inner diameter 23 of the inlet tube. The cone portion 510 cooperates with a tapered portion 514 within the inner diameter to center the end cap, and in some embodiments cause the core to expand slightly, engaging the inside diameter of the metal insert. The flange portion 512 prevents the metal insert from being pulled off of the stem during use.

Figure 22:
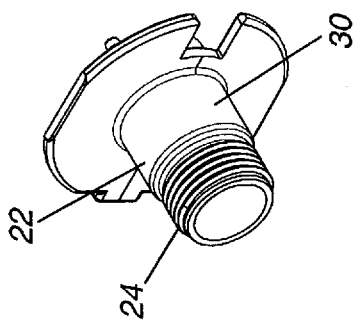
FIG. 22 is a partial top perspective view of one embodiment of the in-tube shown in FIG. 1 illustrating a solid metal type of construction for the composite in-tube.
Figure 24:
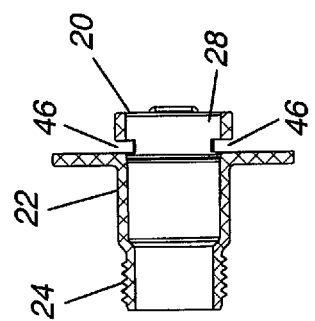
FIG. 24 is a section view taken along lines 24-24 of FIG. 23 illustrating the metal and resin portions of the composite in-tube.
Figure 23:
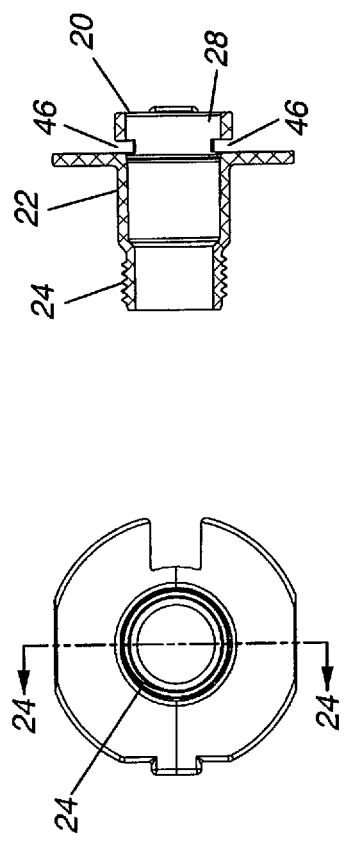
FIG. 23 is a front view of the in-tube shown in FIG. 22.

Referring to FIGS. 22-24, an alternative embodiment of the inlet tube 12 is illustrated. In this embodiment, the entire inlet tube 12 is formed from a suitable metal such as aluminum or zinc to cooperate with the outlet conduit, which may be constructed entirely of plastic. Alternatively, the outlet conduit may be constructed from plastic and include one of the metal inserts described above.

Referring to FIGS. 25-27, an alternative embodiment of the inlet tube 12 is illustrated. In this embodiment, the metal insert 700 is plated onto the core 19 of the first end 18 of the inlet tube 12 as illustrated in FIG. 27. Bead or sand blasting, chemical etching, copper cladding or the like may be utilized to prepare the core 19 for the metal plating which also prevents the metal insert 700 from being pulled off of the first end of the main body under pressure or when the hose member is connected to the inlet tube 12.

What is claimed is:

1. A composite rotary union assembly comprising:
    an inlet tube constructed from plastic, said inlet tube including a first end and a second end, an inlet tube main body extending between said first end and said second end, said first end constructed and arranged for connection to a pressurized fluid supply, said first end including a metal insert having an outer surface constructed and arranged to provide said connection to said pressurized fluid supply, said first end of said inlet tube includes a plastic core, said plastic core extending through and in substantially continuous contact with said metal insert forming a bi-material first end, a distal surface of said bi-material end being continuous and circular to provide a sealing surface for engaging a seal within a female coupling of said pressurized fluid supply, said inlet tube main body being tubular in construction for passage of said pressurized fluid, said second end constructed and arranged for fluid tight rotational connection to said outlet conduit;
    an outlet conduit fluidly coupled to said inlet tube for rotational movement therebetween, whereby one of said inlet tube or said outlet conduit is fixed in position while the other is free to rotate while maintaining a fluid tight seal; and
    a securing member, said securing member constructed and arranged for securing said inlet tube to said outlet conduit while allowing said rotational connection therebetween.

2. The composite rotary union assembly of claim 1 wherein a portion of said main body of said inlet tube includes an inner diameter which is larger than an outer diameter of a portion of an outlet conduit, whereby a portion of said inlet tube overlaps a portion of said outlet conduit, at least one seal member positioned between said overlapping portions.

3. The composite rotary union assembly of claim 2 wherein said at least one seal member is an O-ring, said outlet conduit including at least one O-ring groove for containing said O-ring.

4. The composite rotary union assembly of claim 2 wherein said second end of said inlet tube includes a keying window, said keying window positioned to align with a snap ring groove positioned on said outlet tube, said securing member engaging said keying window and said snap ring groove to allow rotation between said inlet tube and said outlet conduit.

5. The composite rotary union assembly of claim 1 wherein said metal insert is molded in place during the molding of said inlet tube.

6. The composite rotary union assembly of claim 5 wherein said metal insert includes a first substantially smooth bore and a second bore that includes undulations, said undulations constructed and arranged to cooperate with said plastic to prevent rotation of said metal insert with respect to said inlet tube.

7. The composite rotary union assembly of claim 6 wherein said first end of said inlet tube includes an integrally formed flange covering the end portion of said metal insert to prevent said metal insert from being pulled off said inlet tube, said integrally formed flange forming said sealing surface.

8. The composite rotary union assembly of claim 1 wherein said metal insert is pressed onto said inlet tube after molding of said inlet tube.

9. The composite rotary union assembly of claim 8 wherein said first end of said inlet tube includes at least one ramp lock catch positioned to cooperate with at least one ramp lock positioned within said metal insert bore.

10. The composite rotary union assembly of claim 9 wherein said ramp lock includes a sloped portion and a vertical face, said sloped portion being constructed and arranged to cause said plastic core to deform sufficiently to allow said ramp lock to pass over said core until it enters said ramp lock catch allowing said vertical face of said ramp lock to engage a front face of said ramp lock catch securing said metal insert in position.

11. The composite rotary union assembly of claim 8 wherein said first end of said core includes at least one key member, said at least one key member positioned and sized to cooperate with at least one keyway formed into said first bore of said metal insert.

12. The composite rotary union assembly of claim 11 wherein said at least one key member is integrally formed on said core.

13. The composite rotary union assembly of claim 1 wherein said first end of said inlet tube includes a hot formed flange for holding said metal insert in position on said first end of said core, said hot formed flange forming said sealing surface.

14. The composite rotary union assembly of claim 13 wherein said first end of said core includes at least one key member, said at least one key member positioned and sized to cooperate with at least one keyway formed into said first bore of said metal insert.

15. The composite rotary union assembly of claim 1 wherein said metal insert is secured to said first end of said core by the process of roll forming.

16. The composite rotary union assembly of claim 15 wherein said core of said inlet tube is provided with at least one roll bead which is molded in place on said core, a portion of said metal insert being roll formed into said at least one roll bead.

17. The composite rotary union assembly of claim 1 wherein said metal insert is secured to said first end of said core by an end cap, said end cap including a stem portion and a flange portion, said stem portion tubular in shape having an outer diameter sized to cooperate with said bore of said inlet tube, said flange portion sized to prevent said metal insert from being pulled off of said core during use, said flange portion forming said sealing surface.

18. The composite rotary union assembly of claim 17 wherein end cap includes a cone portion, said cone portion constructed and arranged to cooperate with a tapered portion in the bore of said inlet tube to center said end cap within said bore.

19. The composite rotary union assembly of claim 18 wherein said cone and said tapered portion cooperate to expand said core to engage said first bore in said metal insert.

20. The composite rotary union assembly of claim 1 wherein said inlet tube is formed completely from metal and said outlet conduit is formed completely from plastic.

21. The composite rotary union assembly of claim 1 wherein said metal insert is a metal plated onto a plastic substrate.

22. The composite rotary union assembly of claim 1 wherein said outlet conduit includes a metal insert, said metal insert having an outer surface constructed and arranged to provide said connection to said pressurized fluid supply.

* * * * *